US007024494B1

(12) United States Patent
Pathan et al.

(10) Patent No.: US 7,024,494 B1

(45) Date of Patent: Apr. 4, 2006

(54) METHOD AND SYSTEM FOR CONFIGURING A PERIPHERAL CARD IN A COMMUNICATIONS ENVIRONMENT

(75) Inventors: Arnavkumar M. Pathan, Sunnyvale, CA (US); Lucy Chiu, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 92 days.

(21) Appl. No.: 10/436,703

(22) Filed: May 12, 2003

(51) Int. Cl.
*G06F 3/00* (2006.01)

(52) U.S. Cl. ........................... 710/10; 710/8; 710/302; 710/313; 711/2; 711/100

(58) Field of Classification Search ............. 710/8–10, 710/300–302; 713/2, 10
See application file for complete search history.

(56) References Cited

U.S. PATENT DOCUMENTS 5,608,876 A 3/1997 Cohen et al. ............... 395/281
5,737,524 A 4/1998 Cohen et al. .......... 395/200.01
5,925,119 A * 7/1999 Maroney .................... 710/315
6,308,234 B1 10/2001 Davies et al. ............... 710/104
6,356,959 B1 * 3/2002 Thomas et al. ................ 710/2
6,421,755 B1 7/2002 Rao ........................... 710/302
6,799,234 B1 9/2004 Moon et al. ................ 710/110
2002/0144024 A1 * 10/2002 Kumpf et al. ................ 710/12
2004/0177196 A1 9/2004 Moon et al. ............... 710/300

OTHER PUBLICATIONS

"Why PC/104? The need for an embedded-PC Standard", http://www.pc104.org/technology/, (no date).*
"What is PC/104-Plus" http://www.pc104.org/technology/plus_info.html, (no date).*
"PCI Bus Overview", http://www.quatech.com/support/comm-over-pci.php, (no date).*

* cited by examiner

*Primary Examiner*—Kim Huynh
(74) *Attorney, Agent, or Firm*—Baker Botts L.L.P.

(57) ABSTRACT

A method for communicating data includes receiving at a main card a first media access control (MAC) address of a first peripheral component interconnect (PCI) card coupled to the main card and determining whether the first peripheral card has been previously used with the main card based on the received first MAC address. The method includes assigning a first previous ID value to the first peripheral card if the first peripheral card has been previously used with the main card and assigning a first new ID value to the first peripheral card if the first peripheral card has not been previously used with the main card. The method also includes storing the first new ID value with the received first MAC address in memory of the main card.

24 Claims, 2 Drawing Sheets

METHOD AND SYSTEM FOR CONFIGURING A PERIPHERAL CARD IN A COMMUNICATIONS ENVIRONMENT

TECHNICAL FIELD OF THE INVENTION

This invention relates in general to peripheral cards and more particularly to a method and system for configuring a peripheral card in a communications environment.

BACKGROUND OF THE INVENTION

Data communications has become increasingly important in today's society. One aspect associated with data communications relates to the use of peripheral cards. Peripheral cards may be generally assigned resources and/or configured to operate in a certain mode. Some peripheral card systems may utilize a stack through connector to aid in configuring the cards. One problem associated with systems that include peripheral cards is that end users or pilots may misconfigure or incorrectly assign resources or identities to components, devices or elements. This may be important in cases where some entity relies on the identification of a corresponding peripheral card to implement a particular functionality or device in a corresponding architecture. In other scenarios, peripheral cards may generally have restricted adaptability and limited versatility. These deficiencies may operate to inhibit system performance and provide inadequate solutions for data communications systems.

SUMMARY OF THE INVENTION

The present invention provides a method and system for configuring a peripheral card in a communications environment that substantially eliminates or reduces at least some of the disadvantages and problems associated with previous methods and systems.

In accordance with a particular embodiment of the present invention, a method for communicating data includes receiving at a main card a first media access control (MAC) address of a first peripheral card coupled to the main card and determining whether the first peripheral card has been previously used with the main card based on the received first MAC address. The method includes assigning a first previous ID value to the first peripheral card if the first peripheral card has been previously used with the main card and assigning a first new ID value to the first peripheral card if the first peripheral card has not been previously used with the main card. The method also includes storing the first new ID value with the received first MAC address in memory of the main card.

Assigning a first previous ID value to the first peripheral card may comprise communicating a first previous ID value to the first peripheral card over a PCI bus, and assigning a first new ID value to the first peripheral card may comprise communicating a first new ID value to the first peripheral card over the PCI bus. Determining whether the first peripheral card has been previously used with the main card based on the received first MAC address may comprise accessing the memory of the main card to search for the received first MAC address. Moreover, assigning a first previous ID value to the first peripheral card may also comprise retrieving the first previous ID value of the first peripheral card from the memory of the main card, and assigning a first new ID value to the first peripheral card may also comprise determining a first new ID value based on a next available unused ID value.

In accordance with another embodiment a system for communicating data includes a first peripheral card and a main card coupled to the first peripheral card. The main card includes a PCI bus operable to receive a first MAC address of the first peripheral card and logic operable to determine whether the first peripheral card has been previously used with the main card based on the first MAC address. The logic is also operable to assign a first previous ID value to the first peripheral card if the first peripheral card has been previously used with the main card and to assign a first new ID value to the first peripheral card if the first peripheral card has not been previously used with the main card. The logic is also operable to store the first new ID value with the received first MAC address in memory of the main card. The logic may also be operable to communicate the first previous ID value to the first peripheral card over the PCI bus and communicate the first new ID value to the first peripheral card over the PCI bus.

Technical advantages of particular embodiments of the present invention include a method for configuring peripheral cards in a communications environment, such as a PC104+ environment, that does not require additional physical connectors to the cards with additional pins. Accordingly, manufacturing costs are reduced and space in a card stack is saved. Additionally, identifications for the peripheral cards are assigned automatically instead of manually, and such assignments are consistent from one power up to the next. Accordingly, manual actions for configuration are reduced which minimizes configuration errors.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

Figure 1:
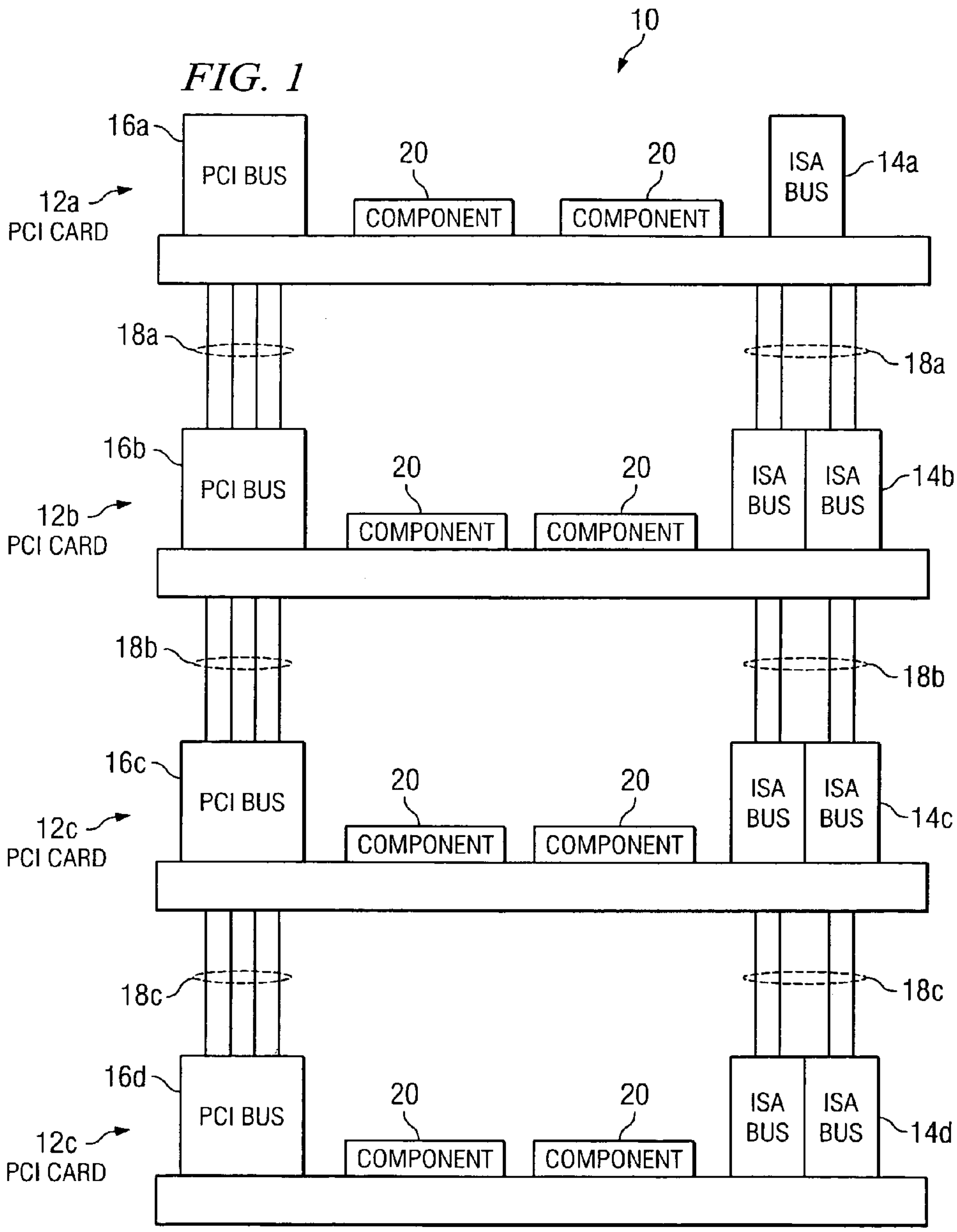
FIG. 1 is a simplified block diagram of a communication system for configuring elements in a communications environment, in accordance with a particular embodiment of the present invention.

FIG. 1 is a simplified block diagram of a communication system 10 for configuring elements in a communications environment. Communication system 10 may include one or more peripheral component interconnect (PCI) cards 12*a*–12*d*. Communication system 10 may be positioned in any suitable communications environment, such as in a card stack that is operable to facilitate packet-based information exchanges. Communication system 10 may also be positioned in a circuit-switched network or in any other suitable environment where peripheral cards 12*a*–12*d* may be implemented in order to perform some operation or task. In a particular embodiment of the present invention, communication system 10 may be implemented in conjunction with a PC104+ protocol. PC104+ reflects an industry standard computing platform that is compatible with communication system 10.

In accordance with the teachings of the present invention, communication system 10 provides an architecture for consistent automatic identification and assignment for peripheral cards 12*a*–12*d* without requiring additional physical connectors or pins thus reducing manufacturing costs and saving space in a card stack. Depending on how they are stacked, peripheral cards 12*a*–12*d* may automatically assign identifications. As an example, if an end user stacked elements with a serial port as the first card, a serial port as the second card, and an Ethernet port as the third card, then port one equals serial, port two equals serial and port three equals Ethernet. Thus, as peripheral cards 12*a*–12*d* are plugged into the stack, their identities may be automatically and consistently assigned by a main or hosting card. This reduces the need for manual actions during configuration thereby minimizing configuration errors.

Failure to operate switches properly in a given stack by an end user or a pilot may cause significant problems. For example, bus transfers could be problematic in cases where cards are incorrectly configured or inaccurately identified. Additionally, architectures or stacks that may include peripheral cards 12*a*–12*d* are generally embedded (and often hidden) and, in most cases, complex. Peripheral cards 12*a*–12*d* avoid such a dilemma because they may communicate with each other and execute identification, assignment and coordination operations with a main card. In this sense, peripheral cards 12*a*–12*d* are aware of each other and legacy components and may configure themselves accordingly and signal this to an end user.

The configuration of communication system 10 operates to retain or hold a consistent assignment of identities for each of peripheral cards 12*a*–12*d*. Peripheral cards 12*a*–12*d* may also simultaneously accommodate manually configured and automatically configured resources in communications system 10.

In general, devices are not able to coexist in automatic and manual configurations. Peripheral cards 12*a*–12*d* avoid this problem and provide an environment in which a mixture of automatically and manually configured elements may properly coexist. This allows communication system 10 to offer plug and play capabilities for a corresponding architecture, such as a personal computer (PC) for example. In addition, resources may be properly assigned in communication system 10, which provides the capability to reasonably predict designated operations for each slot in a given architecture.

Peripheral cards 12*a*–12*d* are data processing elements that may be inserted into a given slot, of an architecture or a system stack. Peripheral cards 12*a*–12*d* each include buses 14 and 16, pins 18 and components 20. In particular embodiments, buses 14 may comprise 104-pin ISA buses, and buses 16 may comprise 120-pin high speed PCI buses. Peripheral cards 12*a*–12*d* may fit together in parallel, whereby a bus of one card may receive the pins of the card above it. Peripheral cards 12*a*–12*d* may share one or more of the same signals. Peripheral cards 12*a*–12*d* may include physical connectors, such as Ethernet connectors or serial connectors. Peripheral cards 12*a*–12*d* may also include appropriate processing capabilities as well as memory storage that facilitates data processing and data propagation in a particular environment. For example, components 20 may comprise central processing units (CPUs), memory, logic or other components. Peripheral cards 12*a*–12*d* may be routers, Ethernet cards, fast serial cards, universal serial bus (USB) cards, main boards, power cards, switches, bridges, gateways or any other appropriate elements suitable to facilitate data exchanges in a communications environment. Peripheral cards 12*a*–12*d* may include any suitable hardware, software, element or object operable to facilitate these or additional operations in accordance with particular needs.

Figure 2:
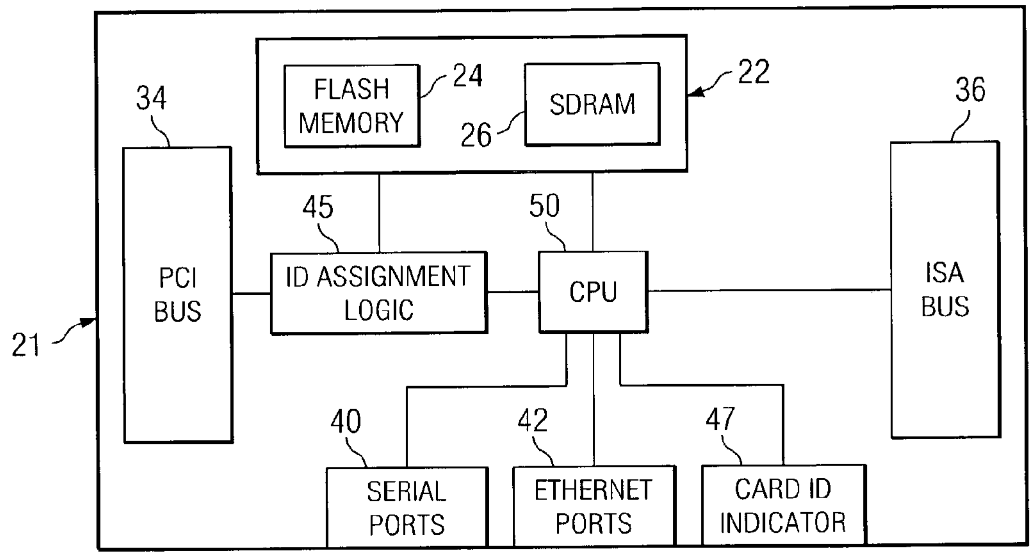
FIG. 2 is a simplified block diagram of a peripheral card with various components, in accordance with an embodiment of the present invention.

FIG. 2 is a simplified block diagram of a peripheral card 21 illustrating various elements that may be included within (or external to) a peripheral card in accordance with an embodiment of the present invention, such as peripheral cards 12*a*–12*d* of FIG. 1. The elements illustrated within peripheral card 21 are provided for purposes of teaching only and should therefore be construed as such. Moreover, because the internal structure of peripheral card 21 has been offered for purposes of example only, numerous other components may be included therein that effectuate similar functionalities or operations. In addition, some of the components illustrated as within peripheral card 21 may be deleted where appropriate and in accordance with particular needs.

In the example embodiment, peripheral card 21 includes a memory 22 that includes a flash memory 24 and a synchronous dynamic random access memory (SDRAM) 26. In the event that card 21 is a main card, flash memory 24 may contain a data structure that has the manually configured peripheral card identifications stored in it and reflect elements such as card ID, card type and whether one or more of the cards are enabled or disabled. In the event that card 21 is a main card, memory 22 may contain the active peripheral card table that is a table of the preceding elements, i.e. card identification, card type, and enabled/disabled status.

Peripheral card 21 includes a PCI bus 34 and a ISA bus 36. PCI bus 34 may communicate using PCI signals that may utilize a suitable header endemic to the particular standard being implemented. ISA bus 36 communicates using PC/104 technology. PCI bus 34 and ISA bus 36 may also be coupled to additional peripheral cards where appropriate for communication with other peripheral cards, as illustrated in FIG. 1 with respect to peripheral cards 12*a*–12*d*. Peripheral card 21 may also include a set of serial ports 40 and a set of Ethernet ports 42. Peripheral card 21 may additionally include a central processing unit (CPU) 50. Peripheral card 21 may include ID assignment logic 45 if peripheral card 21 is acting as a main card to assign identification values to other peripheral cards in a stack.

In particular embodiments, peripheral cards 12*a*–12*d* and 21 may achieve generally three modes of operation. In a first mode, a PCI master, or main, mode may be achieved, whereby an arbiter function and clock function may be provided by the peripheral card. In particular embodiments, the arbiter function may be provided by a PCI arbiter, and the clock function may be provided by a programmable clock. In a second mode, a slave mode may be achieved, whereby the peripheral card operates as a peripheral option device and does not utilize an arbiter function if it even has such capabilities. The peripheral card may then synchronize a clock to the PCI bus instead. In a third mode, a passive mode may be achieved, in which the peripheral card is neither slave nor master.

Peripheral card 21 may include a card identification indicator 47 so that an end user or a pilot may better understand the configuration of a given system associated with peripheral card 21 by viewing a signal or indication generated by the card at the card identification indicator. Card identification indicator 47 may be a liquid crystal display (LCD), light emitting diode (LED), or any other suitable element that operates to signify an identification parameter (or identity) of peripheral card 21. This identity may be consistent and may hold true from 'boot to boot' and even in cases where the card may be replaced in communication system 10. Any suitable identification parameter may be displayed by a selected peripheral card (e.g. via card identification indicator 47). For example, the LCD or LED may communicate slot identities to an end user visually such that peripheral cards in a stack may be properly mapped out or configured. This allows the end user or pilot to avoid setting any switches or attempting to configure any elements in an improper fashion. Alternatively, identification parameters may be inclusive of the particular mode in which a corresponding peripheral card is operating. Other configuration identification parameters may include capacity or performance characteristics, activity status, connector information, or information associated with other elements in the corresponding architecture. In particular embodiments, card identification indicator 47 may be external to peripheral card 21.

Peripheral card 21 may also accommodate legacy peripheral cards that are provided in a given system. As an example, a master or main card may be configured to know about potential cards that implement manual identification elements. For example, a particular card identification (slot) may be manually defined. Because the main card may start the counting sequence for automatic assignment and because the main card may know about the manually configured cards (through some sort of configuration as may be stored in flash memory 24), it can simply add some constant other than one to its identification output to make room for a manually configured card.

In order to address scenarios in which multiple master or main devices are present in the same stack or architecture, consider that by definition a PCI backplane may consist of a master or main device and zero or more slave devices. In a particular embodiment that implements the PC104+ standard, the same assumption may be made, and thus a single main device may be accommodated on the PCI backplane. The main device may be responsible for arbitration on the PCI backplane and may use a master/slave concept for this purpose. Specifically, a slave device may request access to PCI bus 34 by asserting one of several PCI request lines. The main device may then decide, from potential requesters, which device to grant access to PCI bus 34 by asserting one of several corresponding grant lines.

At the point of a given communications element (e.g. router) where the main card of the router executes input output supervision (IOS) and is typically the PCI main device, it may subsequently have zero or more slave devices attached via a PCI backplane. Those devices may be PCI slave devices providing some form of input/output, such as an Ethernet card for example. This arrangement may be physically embodied in a form that consists of a larger motherboard with several PCI connectors into which daughter cards may be plugged. In such an arrangement, more than one motherboard may not be possible. However, in a PC104 or PC104+ environment, cards may stack through and have the same general size and connector types. In such a case, more than one peripheral card 12*a*–12*d* may be placed into the same stack physically. A PCI arbiter may be coupled to a PCI bus on a PC104 or PC104+ stack to exploit the card identification derived by auto-configuration (that may be generated by one or more algorithms).

The combination of card identification and a modified arbiter/PCI interface allows peripheral cards 12*a*–12*d* to be stacked with other devices in order to form a more scaleable and robust platform. In a passive mode, a selected peripheral card 12*a*–12*d* may be added to a stack in which some foreign device (such as a PC for example) may utilize, the PCI backplane, and the selected peripheral card 12*a*–12*d* may no longer provide or support PCI functionality but may continue to share space and power.

In operation of an example embodiment, peripheral cards 12*a*–12*d* may be powered up. Peripheral cards 12*a*–12*d* may be physically stacked in a particular order. This stacking order may determine the order in which the system operates. Power may then be applied to the card stack.

An auto-identification may then be executed. The auto-identification may be effectuated using suitable software or algorithms that automatically configure an identification associated with peripheral cards 12*a*–12*d*. Peripheral cards 12*a*–12*d* may collectively realize their order and their respective identities.

The main card may execute a series of identification checks or other suitable initialization protocols and may discover what is on the backplane and what kind of resources (peripheral cards) the backplane requires. The main card may poll each of the slave cards in order to discover what serial cards, Ethernet cards, etc. are currently in the stack. A PCI initialization sequence may then be executed.

The main card may get identity information and initialize a set of device drivers so that it can communicate with each peripheral card in the stack. The main card may identify when a direct memory access (DMA) transfer occurs and may further determine that the transfer is propagating from a serial port, an Ethernet port or any other suitable port. At this point, the system is operational as the stack is running and the slot addresses of the given peripheral cards have been determined. Once the initialization sequence is finished, the backplane may be freed to be arbitrated such that normal traffic may propagate.

To achieve automatic configuration and assignment consistency, ID assignment logic 45 maintains a database of ID assignments and MAC addresses in a cookie on the main card. As an example, one of peripheral cards 12*a*–12*d* may operate as a main card. After reset, a card on the PCI backplane requests to register with the main card and provides its media access control (MAC) address.

When the system is powered up, there may be no ID assignment data in memory 22. ID assignment logic 45 of the main card scans PCI bus 34 to find peripheral cards with manual ID assignment and to find the first unused ID value. If any of the peripheral cards in the stack have a manually-assigned identification value, then ID assignment logic 45 stores this manually-assigned ID value with the MAC address of the particular peripheral card in memory 22 of the main card. Peripheral cards without a manually-assigned value may be automatically assigned an identification value by ID assignment logic 45 based on the next available unused ID assignment values. The next available value may be based on a sequential numbering of ID assignment values. The automatically-assigned ID values may be stored with the MAC addresses of the particular peripheral cards in memory 22 of the main card. The ID assignment and MAC address information may be stored in a table in flash memory 24. An example of such a table is below.

| MAC ADDRESS | PCI ID ASSIGNMENT |
|---|---|
| 00ff.ff40.0087 | 0 |
| 00ff.ff53.1099 | 1 |
| 00ff.ff63.f587 | 2 |

On subsequent power up, ID assignment logic 45 finds the MAC addresses for the particular peripheral cards in the stack in memory 22 of the main card. ID assignment logic 45 assigns the stored PCI ID assignment value for each MAC address to each respective peripheral card to maintain consistency of ID assignment to each card between power cycles.

When a new peripheral card is added to the system, on the next power up ID assignment logic 45 may not find an entry for that peripheral card's MAC address in memory 22 of the main card. In such case, ID assignment logic 45 scans all the stored ID assignment values in memory 22 and scans PCI bus 34 for all cards that have previously-assigned ID values to determine the first unused ID assignment value. ID assignment logic 45 assigns this value to the new peripheral card. This assignment may be stored in memory 22 of the main card for subsequent reassignment to the new peripheral card.

Figure 3:
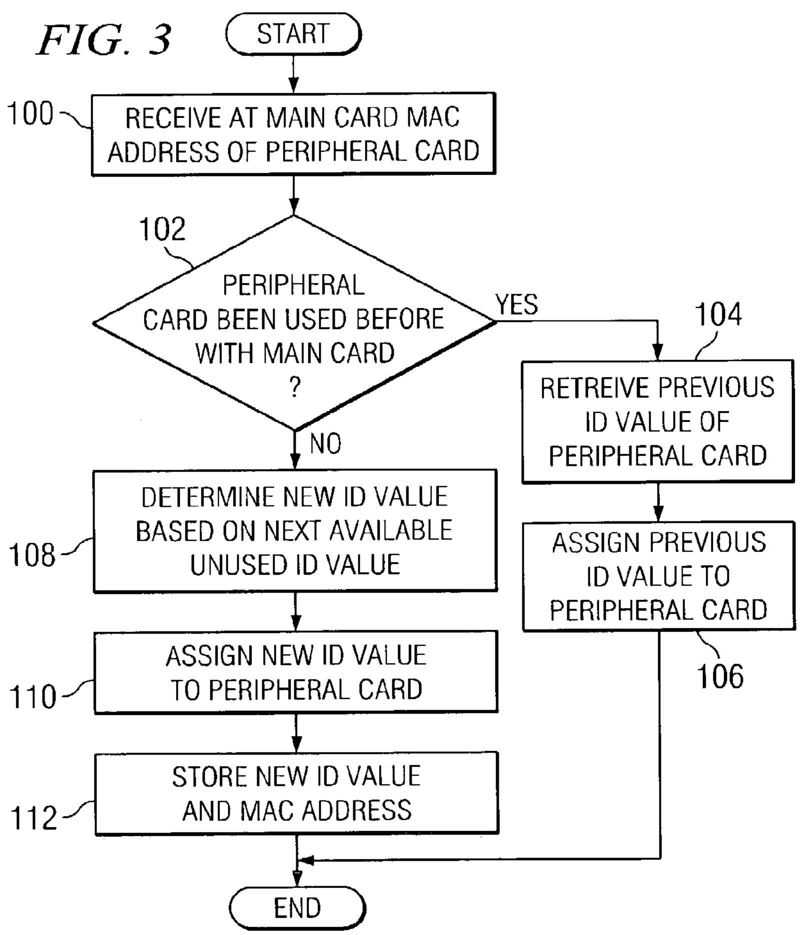
FIG. 3 is a simplified flowchart illustrating a series of example steps associated with a method for configuring a peripheral card in a communications environment.

FIG. 3 is a simplified flowchart illustrating a series of example steps associated with a method for configuring a peripheral card in a communications environment. The method may begin at step 100 where a MAC address of a peripheral card is received at a main card coupled to the peripheral card. The main card may be one of peripheral cards 12*a*–12*d* of FIG. 1, for example peripheral card 12*d*, and the peripheral card of step 100 may be another of peripheral cards 12*a*–12*d* of FIG. 1. Thus, it should be understood that the "main card" in this example may be a type of peripheral card; however, it will be referred to as the "main card" in this example in order to distinguish it from the peripheral card which is being configured according to the illustrated steps. The MAC address of the peripheral card may be received by the main card by communication through PCI buses of both the peripheral card and the main card. At step 102, the main card determines whether the peripheral card has previously been used with the main card. Such determination may be made by accessing memory of the main card to search for the MAC address of the peripheral card.

If it is determined that the peripheral card has been previously used with the main card (for example, if the peripheral card's MAC address is present in the memory of the main card), then at step 104 the previous ID value of the peripheral card is retrieved from the memory of the main card. At step 106, this previous ID value is assigned to the peripheral card. Such previous ID value may be communicated to the peripheral card through PCI buses of the main card, the peripheral card and any other cards in between the main card and the peripheral card.

If it is determined that the peripheral card has not been previously used with the main card (for example, if the peripheral card's MAC address is not present in the memory of the main card), then at step 108 a new ID value is determined by the main card based on the next available unused ID value. For example, if the ID values 0, 1 and 2 have been used by other peripheral cards, then the next available unused ID value may be 3. At step 110, the new ID value is assigned to the peripheral card. Such new ID value may be communicated to the peripheral card through PCI buses of the main card, the peripheral card and any other cards in between the main card and the peripheral card.

At step 112, the new ID value is stored with the MAC address of the peripheral card in memory of the main card. Such storage enables the main card to access the ID value associated with the peripheral card's MAC address in the future. Thus, on the next power up, the MAC address of the peripheral card will be received at the main card, the main card will determine that the peripheral card has been used before with the main card and the main card will retrieve the previous ID value of the peripheral card for assignment to the peripheral card.

Additional peripheral cards may also be configured in a similar manner, in accordance with particular embodiments. Some of the steps illustrated in FIG. 3 may be combined, modified or deleted where appropriate, and additional steps may also be added to the flowchart. Additionally, steps may be performed in any suitable order without departing from the scope of the invention. These changes may be based on specific stack architectures or particular networking arrangements or configurations and do not depart from the scope or the teachings of the present invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate particular routing architectures. In addition, any of these elements may be provided as separate external components to communication system 10 or each other where appropriate. The present invention contemplates great flexibility in the arrangement of these elements as well as their internal components.

In addition, although FIGS. 1 and 2 illustrate an internal arrangement of peripheral cards 12*a*–12*d* and 21, numerous other components may be used in combination with these elements or substituted for these elements without departing from the teachings of the present invention. Such variations may be dependent on the type of communication propagating through communication system 10 or dependent on particular networking needs or physical restrictions and space allocations.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for communicating data, comprising:

receiving at a main peripheral component interconnect (PCI) card of a plurality of PCI cards a first media access control (MAC) address of a first PCI card of the plurality of PCI cards stackably coupled to the main PCI card through a PCI bus of the main PCI card;

determining whether the first peripheral card has been previously used with the main PCI card based on the received first MAC address;

assigning a first previous ID value to the first peripheral card if the first peripheral card has been previously used with the main PCI card;

assigning a first new ID value to the first peripheral card if the first peripheral card has not been previously used with the main PCI card; and storing the first new ID value with the received first MAC address in memory of the main PCI card; and upon powering up the plurality of PCI cards, determining which of the plurality of PCI cards comprises the main PCI card.

2. The method of claim 1, wherein determining whether the first peripheral card has been previously used with the main PCI card based on the received first MAC address comprises accessing the memory of the main PCI card to search for the received first MAC address.

3. The method of claim 1, wherein assigning a first previous ID value to the first peripheral card comprises retrieving the first previous ID value of the first peripheral card from the memory of the main PCI card.

4. The method of claim 1, wherein assigning a first new ID value to the first peripheral card comprises determining a first new ID value based on a next available unused ID value.

5. The method of claim 1, further comprising:

receiving at the main PCI card a second MAC address of a second peripheral card of the plurality of PCI cards stackably coupled to the main PCI card through a PCI bus of the first PCI card;

determining whether the second peripheral card has been previously used with the main PCI card based on the received second MAC address;

assigning a second previous ID value to the second peripheral card if the second peripheral card has been previously used with the main PCI card;

assigning a second new ID value to the second peripheral card if the second peripheral card has not been previously used with the main PCI card; and storing the second new ID value with the received second MAC address in the memory of the main card.

6. The method of claim 5, further comprising:

receiving at the main PCI card one or more additional respective MAC addresses of one or more additional peripheral cards stackably coupled to the main card through a PCI bus of the second peripheral card;

determining whether the one or more additional peripheral cards have been previously used with the main PCI card based on the received one or more additional respective MAC addresses;

assigning a respective previous ID value to each of the one or more additional peripheral cards that has been previously used with the main PCI card;

assigning a respective new ID value to each of the one or more additional peripheral cards that has not been previously used with the main PCI card; and storing each respective new ID value with the received one or more additional respective MAC addresses in the memory of the main PCI card.

7. The method of claim 1, wherein the main PCI card and the first PCI card comprise PC104+ cards.

8. A system for communicating data, comprising:

a first peripheral component interconnect (PCI) card of a plurality of PCI cards; and a main PCI card of the plurality of PCI cards stackably coupled to the first peripheral card through a PCI bus of the main PCI card, the PCI bus operable to receive a first media access control (MAC) address of the first peripheral card and the main PCI card comprising logic operable to:

determine whether the first peripheral card has been previously used with the main PCI card based on the first MAC address;

assign a first previous ID value to the first peripheral card if the first peripheral card has been previously used with the main PCI card;

assign a first new ID value to the first peripheral card if the first peripheral card has not been previously used with the main PCI card; and store the first new ID value with the received first MAC address in memory of the main PCI card; and wherein the plurality of PCI cards are, upon powering up, operable to determine which of the plurality of PCI cards comprises the main PCI card.

9. The system of claim 8, wherein logic operable to determine whether the first peripheral card has been previously used with the main PCI card based on the first MAC address comprises logic operable to access the memory of the main PCI card to search for the first MAC address.

10. The system of claim 8, wherein logic operable to assign a first previous ID value to the first peripheral card comprises logic operable to retrieve the first previous ID value of the first peripheral card from the memory of the main PCI card.

11. The system of claim 8, wherein logic operable to assign a first new ID value to the first peripheral card comprises logic operable to determine a first new ID value based on a next available unused ID value.

12. The system of claim 8, further comprising:

one or more additional peripheral cards stackably coupled to the main PCI card through a PCI bus of the first PCI card;

the PCI bus of the main card further operable to receive one or more respective MAC addresses of the one or more additional peripheral cards; and the logic of the main PCI card further operable to:

determine whether the one or more additional peripheral cards have been previously used with the main PCI card based on the one or more respective MAC addresses;

assign a respective previous ID value to each of the one or more additional peripheral cards that has been previously used with the main PCI card;

assign a respective new ID value to each of the one or more additional peripheral cards that has not been previously used with the main PCI card; and store each respective new ID value with the one or more respective MAC addresses in the memory of the main PCI card.

13. The system of claim 8, wherein the main PCI card and the first PCI card comprise PC104+ cards.

14. A system for communicating data, comprising:

means for receiving at a main peripheral component interconnect (PCI) card of a plurality of PCI cards a first media access control (MAC) address of a first PCI (PCI) card of the plurality of PCI cards stackably coupled to the main PCI card through a PCI bus of the main PCI card;

means for determining whether the first peripheral card has been previously used with the main PCI card based on the received first MAC address;

means for assigning a first previous ID value to the first peripheral card if the first peripheral card has been previously used with the main PCI card;

means for assigning a first new ID value to the first peripheral card if the first peripheral, card has not been previously used with the main PCI card; and means for storing the first new ID value with the received first MAC address in memory of the main PCI card; and means for, upon powering up the plurality of PCI cards, determining which of the plurality of PCI cards comprises the main PCI card.

15. The system of claim 14, wherein means for determining whether the first peripheral card has been previously used with the main PCI card based on the received first MAC address comprises means for accessing the memory of the main PCI card to search for the received first MAC address.

16. The system of claim 14, wherein means for assigning a first previous ID value to the first peripheral card comprises means for retrieving the first previous ID value of the first peripheral card from the memory of the main PCI card.

17. The system of claim 14, wherein means for assigning a first new ID value to the first peripheral card comprises means for determining a first new ID value based on a next available unused ID value.

18. The system of claim 14, further comprising:

means for receiving at the main PCI card one or more additional respective MAC addresses of one or more additional peripheral cards stackably coupled to the main PCI card through a PCI bus of the first PCI card;

means for determining whether the one or more additional peripheral cards have been previously used with the main PCI card based on the received one or more additional respective MAC addresses;

means for assigning a respective previous ID value to each of the one or more additional peripheral cards that has been previously used with the main PCI card;

means for assigning a respective new ID value to each of the one or more additional peripheral cards that has not been previously used with the main PCI card; and means for storing each respective new ID value with the received one or more additional respective MAC addresses in the memory of the main PCI card.

19. The system of claim 14, wherein the main PCI card and the first PCI card comprise PC104+ cards.

20. Software embodied in a computer readable medium, the computer readable medium comprising code executed to:

receive at a main peripheral component interconnect (PCI) card of a plurality of PCI cards a first media access control (MAC) address of a first PCI card stackably coupled to the main PCI card through a PCI bus of the main PCI card;

determine whether the first peripheral card has been previously used with the main PCI card based on the received first MAC address;

assign a first previous ID value to the first peripheral card if the first peripheral card has been previously used with the main PCI card;

assign a first new ID value to the first peripheral card if the first peripheral card has not been previously used with the main PCI card; and store the first new ID value with the received first MAC address in memory of the main PCI card; and wherein the code is further executed to, upon powering up the plurality of PCI cards, determine which of the plurality of PCI cards comprises the main PCI card.

21. The medium of claim 20, wherein code operable to determine whether the first peripheral card has been previously used with the main PCI card based on the received first MAC address comprises code operable to access the memory of the main PCI card to search for the received first MAC address.

22. The medium of claim 20, wherein code operable to assign a first previous ID value to the first peripheral card comprises code operable to retrieve the first previous ID value of the first peripheral card from the memory of the main PCI card.

23. The medium of claim 20, wherein the code is further operable to:

receive at the main PCI card one or more additional respective MAC addresses of one or more additional peripheral cards stackably coupled to the main PCI card through a PCI bus of the first PCI card;

determine whether the one or more additional peripheral cards have been previously used with the main PCI card based on the received one or more additional respective MAC addresses;

assign a respective previous ID value to each of the one or more additional peripheral cards that has been previously used with the main PCI card;

assign a respective new ID value to each of the one or more additional peripheral cards that has not been previously used with the main PCI card; and store each respective new ID value with the received one or more additional respective MAC addresses in the memory of the main PCI card.

24. The medium of claim 20, wherein the main PCI card and the first PCI card comprise PC104+ cards.

* * * * *